US007730405B2

(12) United States Patent
Gulli et al.

(10) Patent No.: US 7,730,405 B2
(45) Date of Patent: Jun. 1, 2010

(54) METHOD AND SYSTEM TO PRESENT VIDEO CONTENT

(75) Inventors: Antonino Gulli, Pisa (IT); Antonio Savona, Sora (IT); Mario Veri, Rocca San Giovanni (IT)

(73) Assignee: IAC Search & Media, Inc., Oakland, CA (US)

( * ) Notice: Subject to any disclaimer, the term of this patent is extended or adjusted under 35 U.S.C. 154(b) by 282 days.

(21) Appl. No.: 11/297,229

(22) Filed: Dec. 7, 2005

(65) Prior Publication Data

US 2007/0130159 A1    Jun. 7, 2007

(51) Int. Cl.
*G06F 3/00* (2006.01)
*G06G 5/00* (2006.01)

(52) U.S. Cl. .................. 715/719; 715/723; 715/718; 715/722

(58) Field of Classification Search ................. 715/719, 715/716, 723
See application file for complete search history.

(56) References Cited

U.S. PATENT DOCUMENTS

| | | | |
|---|---|---|---|
| 5,594,509 A | 1/1997 | Florin et al. | |
| 5,774,170 A * | 6/1998 | Hite et al. | 725/34 |
| 6,006,265 A * | 12/1999 | Rangan et al. | 709/226 |
| 6,084,628 A | 7/2000 | Sawyer | |
| 6,188,398 B1 | 2/2001 | Collins-Rector et al. | |
| 6,363,204 B1 * | 3/2002 | Johnson et al. | 386/46 |
| 6,381,362 B1 | 4/2002 | Deshpande et al. | |
| 6,456,334 B1 | 9/2002 | Duhualt | |
| 6,463,468 B1 | 10/2002 | Buch et al. | |
| 6,496,857 B1 | 12/2002 | Dustin et al. | |
| 6,573,907 B1 * | 6/2003 | Madrane | 715/719 |
| 6,727,918 B1 * | 4/2004 | Nason | 715/791 |
| 6,850,252 B1 * | 2/2005 | Hoffberg | 715/716 |
| 6,950,623 B2 | 9/2005 | Brown et al. | |
| 6,952,221 B1 * | 10/2005 | Holtz et al. | 715/723 |
| 7,065,709 B2 * | 6/2006 | Ellis et al. | 715/719 |
| 7,155,674 B2 * | 12/2006 | Breen et al. | 715/719 |
| 7,430,360 B2 * | 9/2008 | Abecassis | 386/68 |
| 2002/0032907 A1 | 3/2002 | Daniels | |
| 2002/0063727 A1 * | 5/2002 | Markel | 345/661 |
| 2002/0100041 A1 * | 7/2002 | Rosenberg et al. | 725/32 |
| 2002/0104096 A1 | 8/2002 | Cramer et al. | |
| 2002/0167484 A1 * | 11/2002 | Hatanaka et al. | 345/156 |
| 2003/0034996 A1 * | 2/2003 | Li et al. | 345/719 |
| 2003/0076347 A1 | 4/2003 | Barrett et al. | |
| 2003/0149975 A1 * | 8/2003 | Eldering et al. | 725/34 |
| 2004/0045040 A1 * | 3/2004 | Hayward | 725/135 |
| 2004/0133469 A1 | 7/2004 | Chang | |

OTHER PUBLICATIONS

U.S. Appl. No. 11/297,838, Office Action mailed Nov. 15, 2007.
U.S. Appl. No. 11/297,838, Office Action mailed May 13, 2008.

* cited by examiner

*Primary Examiner*—Dennis-Doon Chow
*Assistant Examiner*—Brandon Parker
(74) *Attorney, Agent, or Firm*—Stephen M. De Klerk; Sonnenschein, Nath & Rosenthal

(57) ABSTRACT

A method and system to preview video content. The system comprises an access component to receive a search request and a loader to simultaneously stream a plurality of videos associated with the search request. The system may further comprise a trigger to detect a pointer positioned over a first video and a mode selector to provide the first video in a preview mode.

10 Claims, 8 Drawing Sheets

METHOD AND SYSTEM TO PRESENT VIDEO CONTENT

FIELD

At least one embodiment of the present invention pertains to information management and retrieval in general, and more particularly, to method and system to present video content.

BACKGROUND

The World Wide Web (the "Web") provides a breadth and depth of information to users. Typically, a user accesses portions of the information by visiting a World Wide Web ("Web") site. Due to the rapid growth of the Web and the number of Web sites accessible via the Web, it is often difficult for a user looking for information about a particular topic to determine if a Web site exists that contains such information, which Web site to go to, or what the Uniform Resource Locator (URL) is for a web site of interest.

As a result of a desire by users to search for relevant Web sites related to various topics of interests, some Web sites provide search services to allow users to search for content on the Web via a browser application present on the user's computer system. When a user submits a query with one or more search terms or keywords to a search script running in the users browser, the search engine that provides the search script to the browser may communicate search results to the user based on the search terms or keywords.

Some existing systems provide video objects in response to a search query. Video objects are sometimes displayed in a form of still pictures with associated links. In order to view a video associated with a particular search result, a user may invoke the associated link to trigger the streaming of the selected video. However, the relevance of video objects is not always apparent from the still pictures or the associated links presented to the user.

SUMMARY OF THE INVENTION

The present invention includes methods and related apparatus to present video content. In one embodiment, the system comprises an access component to receive a search request and a loader to simultaneously stream a plurality of videos associated with the search request. The system may further comprise a trigger to detect a pointer positioned over a first video and a mode selector to provide the first video in a preview mode.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

As described in detail below, the technique introduced herein addresses the need to provide enhanced searching experience for Internet users. When a user submits a query to a search engine, the search engine may deliver one or more videos associated with the search request. In one embodiment of the present invention, the system may stream multiple videos in parallel to enhance user's experience. A user may also be allowed to preview the content associated with a particular presented video by moving a pointer the particular object.

Figure 1:
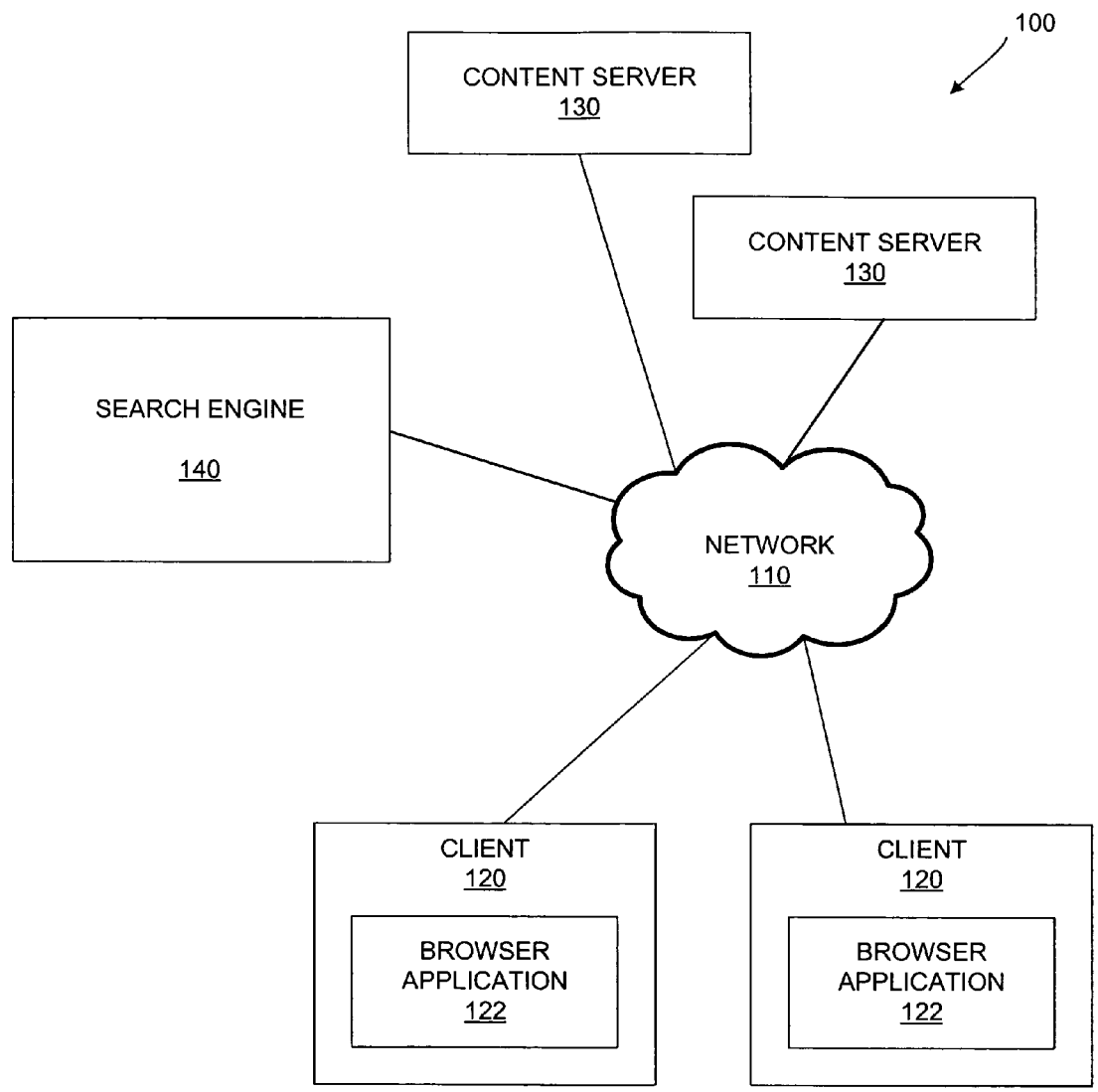
FIG. 1 is a high-level block diagram of an environment in which at least some aspects of the present invention may be used.

FIG. 1 is a high-level block diagram of a system 100 within which at least some aspects of the present invention may be implemented. As shown in FIG. 1, the system 100 comprises a network 110 (e.g., the Internet) and a number of client and server computer systems, such as client systems 120 and content servers 130. The client systems 120 and the content servers 130 may communicate with each other via the network 110.

For the purposes of this description, the term "client system" refers any computing device, including a laptop computer, notebook computer, personal digital assistant (PDA), or handheld wireless phone. The term "server system" refers to any computer system or similar mechanism that stores information and provides information in response to a user request received from a client computer, and/or provides some service. A particular computer system may function both as a client and as a server.

The client system 120, as shown in FIG. 1, may host a number of client applications, such as a browser application 122 (e.g., MS EXPLORER®, developed by Microsoft Corporation of Redmond, of Washington State). The browser application 122 can be used to access remotely available services and content.

In one embodiment of the present invention, users of the client systems 120 may access Web searching services provided by a search engine 140. A search engine, generally, is a service designed to help find information stored within an information space such as the World Wide Web. The search engine 140 allows users of the client systems 120 to request content according to specific criteria (e.g., a plurality of keywords or phrases). The search engine 140 may identify and retrieve content items that match those criteria. In order to process search requests quickly and efficiently, the search engine 140 may use regularly updated indexes associated with content available on the Web. In one embodiment, search functionality of the search engine 140 to request and access video content.

Figure 2:
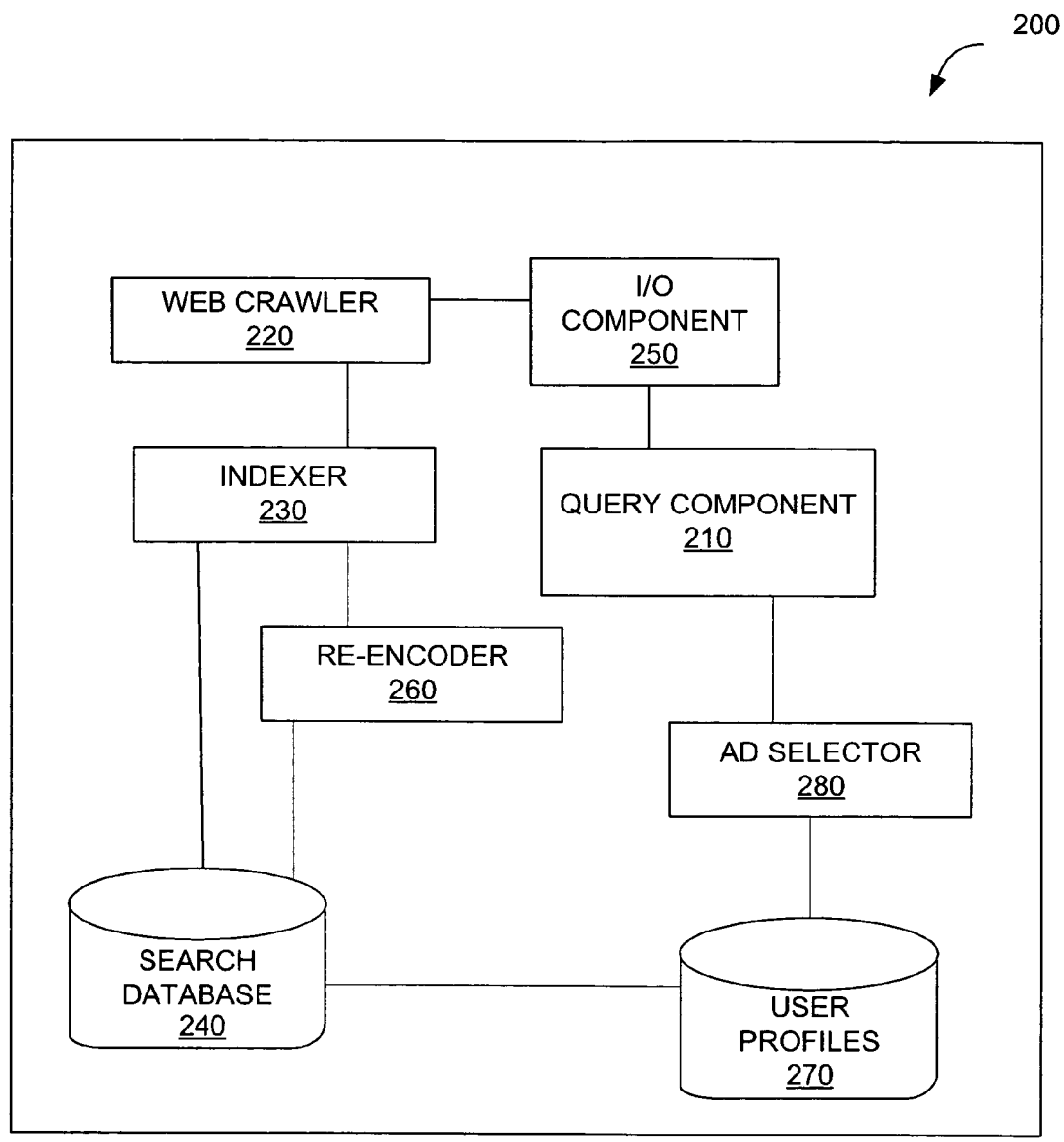
FIG. 2 is a high-level block diagram of server-side components of a search engine, according to one embodiment of the present invention.

FIG. 2 is a high-level block diagram of server-side components of a search engine 200, according to one embodiment of the present invention. The search engine 200 utilizes an input output (I/O) component 250 to receive user queries and to communicate search results and targeted advertisements to the user in response to the queries. The search engine 200 collects data associated with content available on the Web utilizing a web crawler (sometimes also known as a spider), such as a Web crawler 220. The collected data is analyzed and processed by an indexer 230 to generate content metadata. Content metadata may include, for example, an association of a Web page with particular keywords or phrases. Metadata about the content retrieved from the Web may be stored in a search database 240. In one embodiment, the search database 240 stores metadata associated with Web content collected by the crawler 220, metadata associated with TV video feeds, as well as video content stored offline (e.g., on offline storage servers and various video media such as DVDs).

In one embodiment, the search database 240 may store a set of advertisements, e.g., as full encoded videos. The search database 240 may also store lower-resolution versions of video advertisements. A lower-resolution version of a video may be generated by the search engine 200 utilizing a re-encoder 260.

Video advertisements stored in the search database 240 may be annotated with keywords extracted from respective Web pages associated with the videos. An advertising video may also be annotated with keywords extracted from the audio track contained in the video, e.g., utilizing any of the so-called speech-to-text programs. Each keyword associated with a particular video advertisement can be assigned a weight value, according to the frequency with which a keyword occurs in the text or in the audio track associated with the video.

The weight value assigned to a keyword for a particular video advertisement may be adjusted according to additional information collected by the search engine 200 during users' search sessions. Such additional information may include data that indicates how users react to advertisements (e.g., video advertisements) provided with various searches (e.g., Web, image, video searches, etc.). For example, when a user enters a search keyword and is served search results with video advertisements, the search engine 200 may keep track of the number of times the user moves the mouse over a particular advertisement or the number of times the video advertisement is presented to the user in a high quality mode.

Information associated with users' behavior collected by the search engine 200 may be stored in user profiles 270. The user profiles 270 may also store historical information associated with users' queries in order to improve personalization and targeting of the advertisements served to the users.

In one embodiment, search results and associated advertisements (e.g., video advertisements) provided to a user may be personalized by utilizing data obtained by monitoring the searches. A group of users may be defined based on similarities between search activities performed by the users during a monitoring period. For example, search activities may be tracked by geographical location, by the number of similar web sites visited during the monitoring period, or by the number of similar queries submitted during the monitoring period. Search activities may also be tracked by video advertisements selected in the past by the users, by video advertisements served to users in high-resolution mode with audio, or by any other metric that may be available from the web traffic data. In one embodiment, the web traffic data may be associated with a definitive group of users. A separate history graph may be generated for each defined group of users.

The activities of individual users may be tracked, for example, by the user's IP (Internet Protocol) address and/or by the use of cookies. A history graph associated with the defined group of users may be generated in order to determine personalized search results or advertisements for a particular user. When a new user is identified who exhibits web activity that is similar to one of the defined groups of users (e.g., geographic location, navigation, queries, etc), the search results and advertisements (e.g., video advertisements) to be provided to the new user may be biased by the history graph. The history graph may represent the web activity of the associated group of users for the period of time related to the monitoring period. For example, the bias may have a lifetime that persists for some multiples of the monitoring period used to define the group of users associated with their history graph.

In one embodiment of the present invention, user queries submitted to the search engine 200 are processed by a query component 210. The query component 210 interrogates the search database 240 with keywords and phrases submitted with the query in order to retrieve search results to be provided to the requesting user.

The query component 210 may cooperate with an advertisement (ad) selector 280 to identify one or more advertisements that may be appropriate to serve to the user in response to a search request (e.g., a particular video search). The ad selector 280 may also be configured to select advertisements to be presented to the user based on IP address of the user's client system 120, or based on other user-specific information (e.g., user's demographic information, user's previous queries, cookies stored on the user's client system, etc.).

Advertisements presented to the user with the results of a search may be in a form of a text or a uniform resource locator (URL). Advertisements may also be presented as a still picture (e.g., a frame extracted from a video advertisement), an audio track, or a video stream. A video advertisement served to a user may also include an audio stream.

It will be noted, that the components of the search engine 200 shown in FIG. 2 may reside on a single computer system, as well as be distributed across a plurality of computer systems. An example of an Internet search engine is one provided by Ask Jeeves® of Oakland, Calif.

Figure 3:
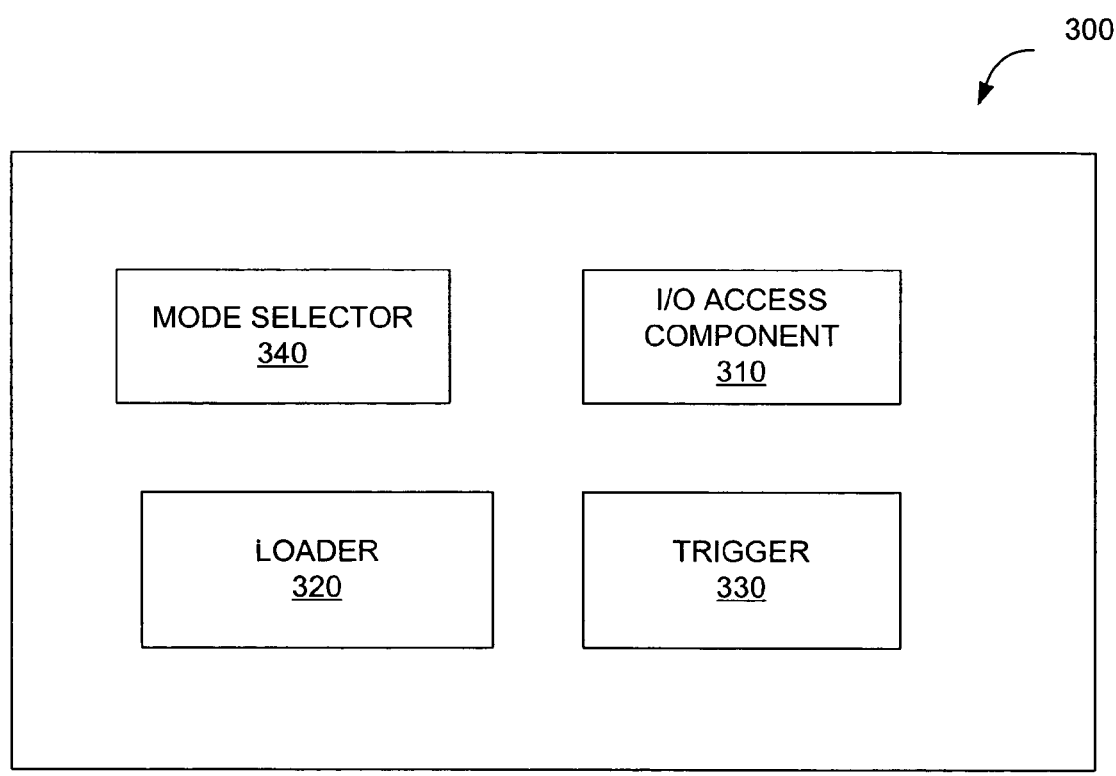
FIG. 3 is a high-level block diagram of client-side components of a search engine, according to one embodiment of the present invention.

FIG. 3 is a high-level block diagram of client-side components of a search engine, according to one embodiment of the present invention. A search service 300 may run in a browser on a client system and may comprise, in one embodiment, an input output (I/O) access component 310 to receive from a user a request for a search (e.g., a video search), a loader 320 to present search results and advertisements to users, a trigger 330, and a mode selector 340. The loader 320 may present search results or advertisements as, for example, still pictures or as streaming videos. In one embodiment, multiple videos may be presented simultaneously, in a streaming mode.

In order to allow multiple video advertisements or multiple video search results to be presented to a user, the loader 320 may initially load lower resolution versions of the videos. A user may be allowed to view a higher-resolution version of a video by moving a pointer (e.g., a pointer operated by a mouse device) over a specific video object. The trigger 330 may be configured to detect an event associated with a pointer being moved over a video (a so-called roll-over event) and invoke the mode selector 340. The mode selector 340 may then replace the specific low-resolution video with a higher resolution version of the video. As mentioned above, a higher-resolution version of a video may be stored in the search database 240 illustrated in FIG. 2.

In one embodiment, a higher-resolution version of a video (e.g., a higher-resolution version of a video advertisement) may be referred to as a preview. When a video object is switched by the video mode selector 340 to a preview mode, the mode selector 340 also may pause the streaming of video for the rest of video objects presented to a user. It will be noted, that the preview technique discussed herein may be utilized to allow a preview of advertisements (e.g., video advertisements), as well as preview of search results. Allowing a preview of a selected search result or an advertisement may comprise providing to user additional information regarding the selected object. For example, in one embodiment, additional information may include audio or video streams, or a combination of audio and video.

Thus, in one embodiment of the present invention, the search service 300 may allow a user to view multiple videos (advertisements, search results, or both) simultaneously in streaming mode, and to preview individual videos by selecting a particular video (e.g., by rolling a pointer over an associated displayed object).

Figure 4:
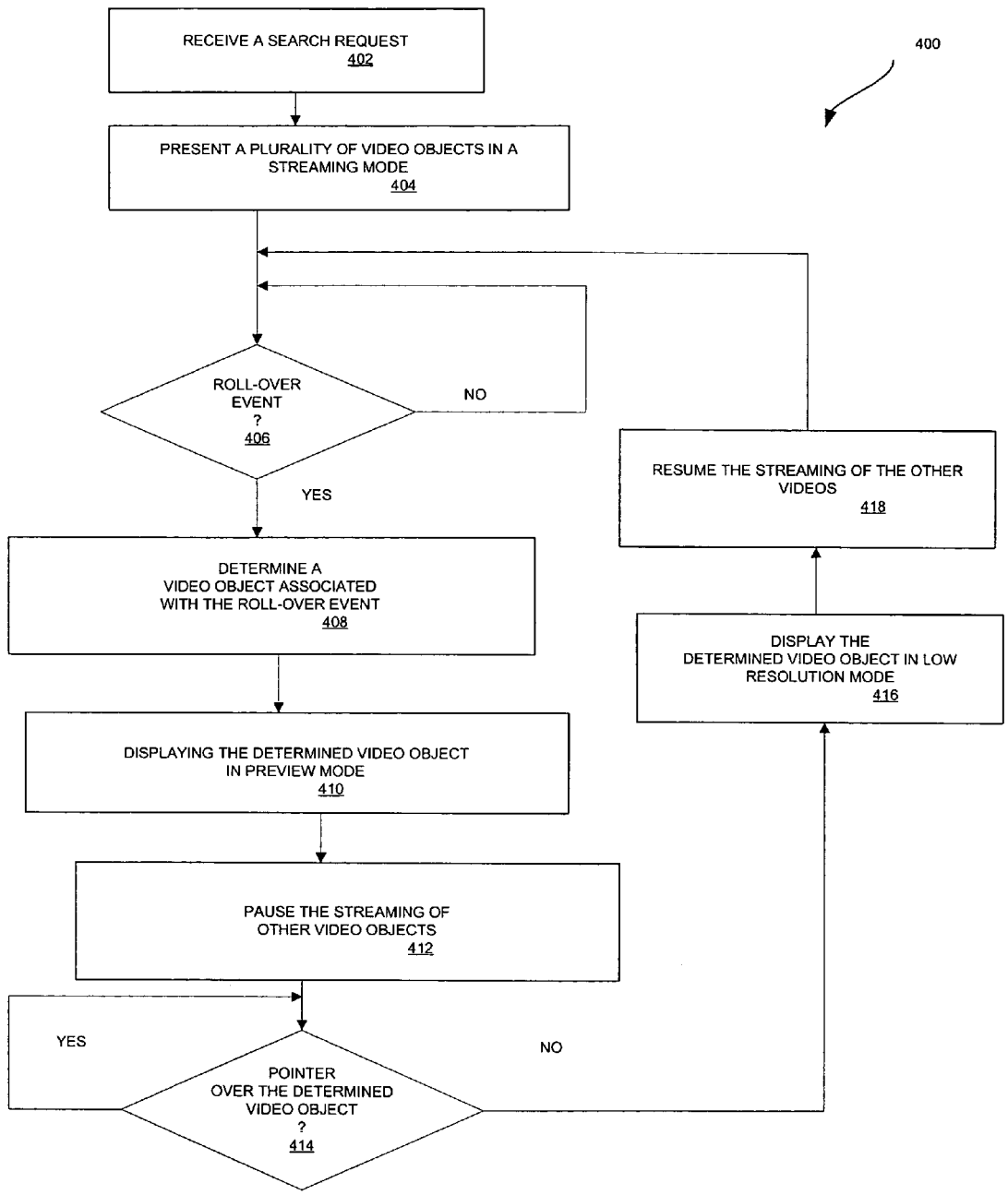
FIG. 4 is a flow chart of a method to present video objects, according to one embodiment of the present invention.

FIG. 4 is a flow chart of a method 400 to present video objects, according to one embodiment of the present invention. The method 400 may be performed by processing logic that may comprise hardware (e.g., dedicated logic, programmable logic, microcode, etc.), software (such as run on a general purpose computer system or a dedicated machine), or a combination of both. It will be noted, that while the method 400 is described with respect to video objects, the method 400 may be utilized for other types of objects, such as text objects and image objects. In one embodiment, the target objects may be search results or advertisements.

Referring to FIG. 4, a search request is received at block 402. Responsive to the search request, multiple video objects may be presented to the requesting user (block 404), such that video is being streamed simultaneously for more than one video object.

In one illustrative embodiment, the method 400 monitors for an event associated with a user selecting a particular video object, e.g., by rolling a pointer over the object on the screen. When a roll-over event is detected (block 406), the video object associated with the event is determined at block 408, and the determined video object is displayed in a preview mode (block 410). For example, in one embodiment, the preview mode may include providing an audio stream for the video object, displaying a higher-resolution version of the video object, commencing the streaming of the associated video, or streaming a higher-resolution version of the video object with an associated audio stream. While the determined video object is being displayed in a preview mode, the streaming of other video objects may be paused (block 412).

When a user moves the pointer off of the video object that is being presented in a preview mode, the trigger 330 (illustrated in FIG. 3) determines that the pointer is no longer positioned over the object (block 414), and the mode selector 340 (illustrated in FIG. 3) replaces the higher-resolution version of the video object with a low-resolution version of the same video object (block 416). The streaming of the rest of the video objects is then resumed (block 418).

It will be noted, that although one operation of methods 400 and 400 may precede another operation, the order of some operations in methods 400 and 400 may be reversed, or the operations may be performed in parallel. For example, in method 400, the displaying of the determined object in preview mode may be performed subsequent to or in parallel with pausing the streaming of other video objects.

Figure 5:
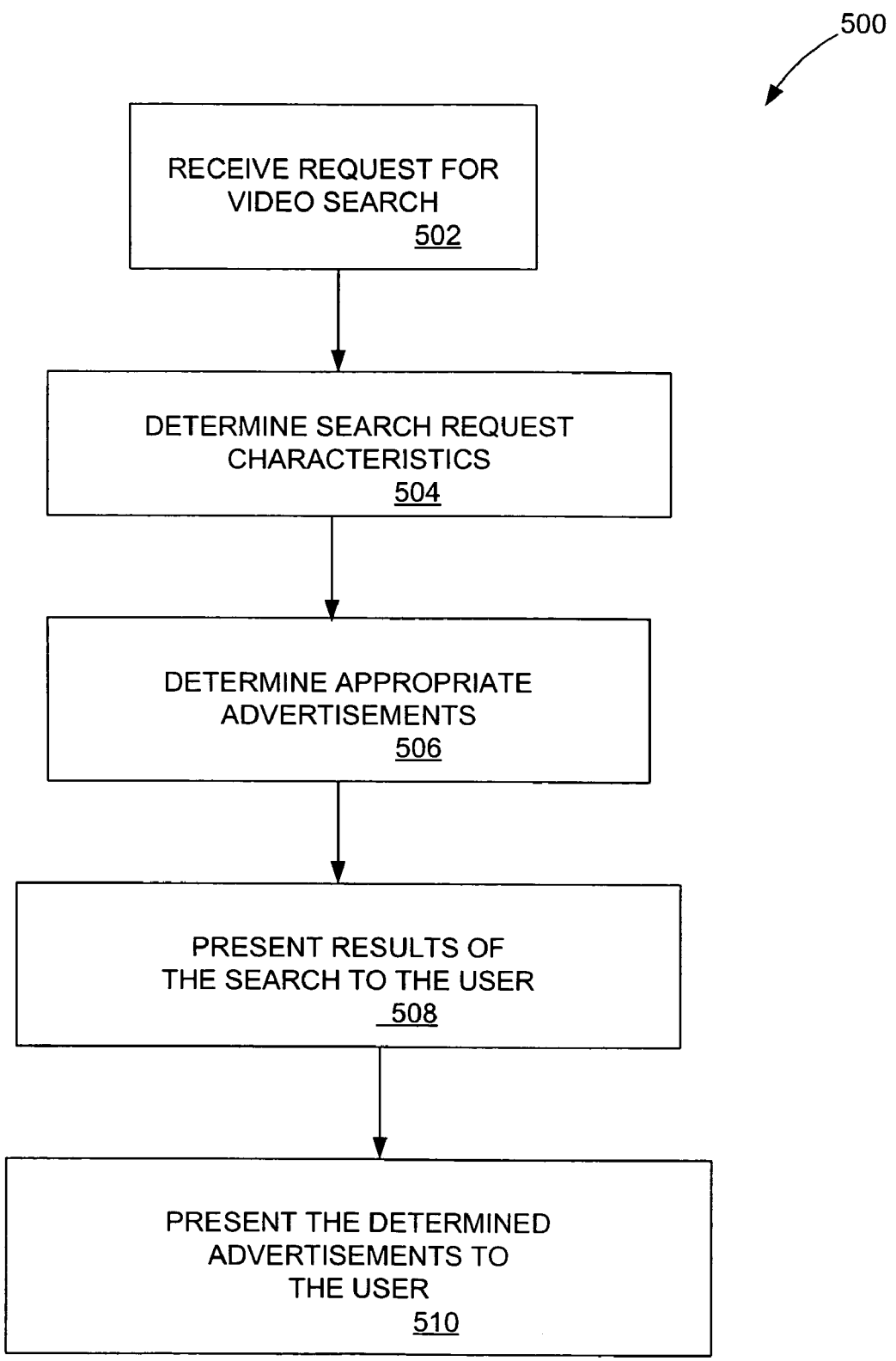
FIG. 5 is a flow chart of a method to preview a video object, according to one embodiment of the present invention.

FIG. 5 is a flow chart of a method 500 to provide advertisements with search results (e.g., video search results), according to one embodiment of the present invention. The method 500 may be performed by processing logic that may comprise hardware (e.g., dedicated logic, programmable logic, microcode, etc.), software (such as run on a general purpose computer system or a dedicated machine), or a combination of both.

Referring to FIG. 5, the method 500 begins with processing logic receiving a request for a search (block 502). The query component 210 determines search request characteristics at block 504, and the ad selector 280 identifies appropriate advertisements to be presented to the user with the video search results based on the search characteristics (block 506). In one embodiment, the search request characteristics may include keywords and phrases associated with the user's query, previous searches requested by the same user, and other information specific to the user.

At block 508, search results (e.g., video search results) are presented to the user along with the determined advertisements (block 510). When advertisements are presented in a form of video objects, a user may be allowed to preview the associated video advertisements, as descried above.

Figure 6A:
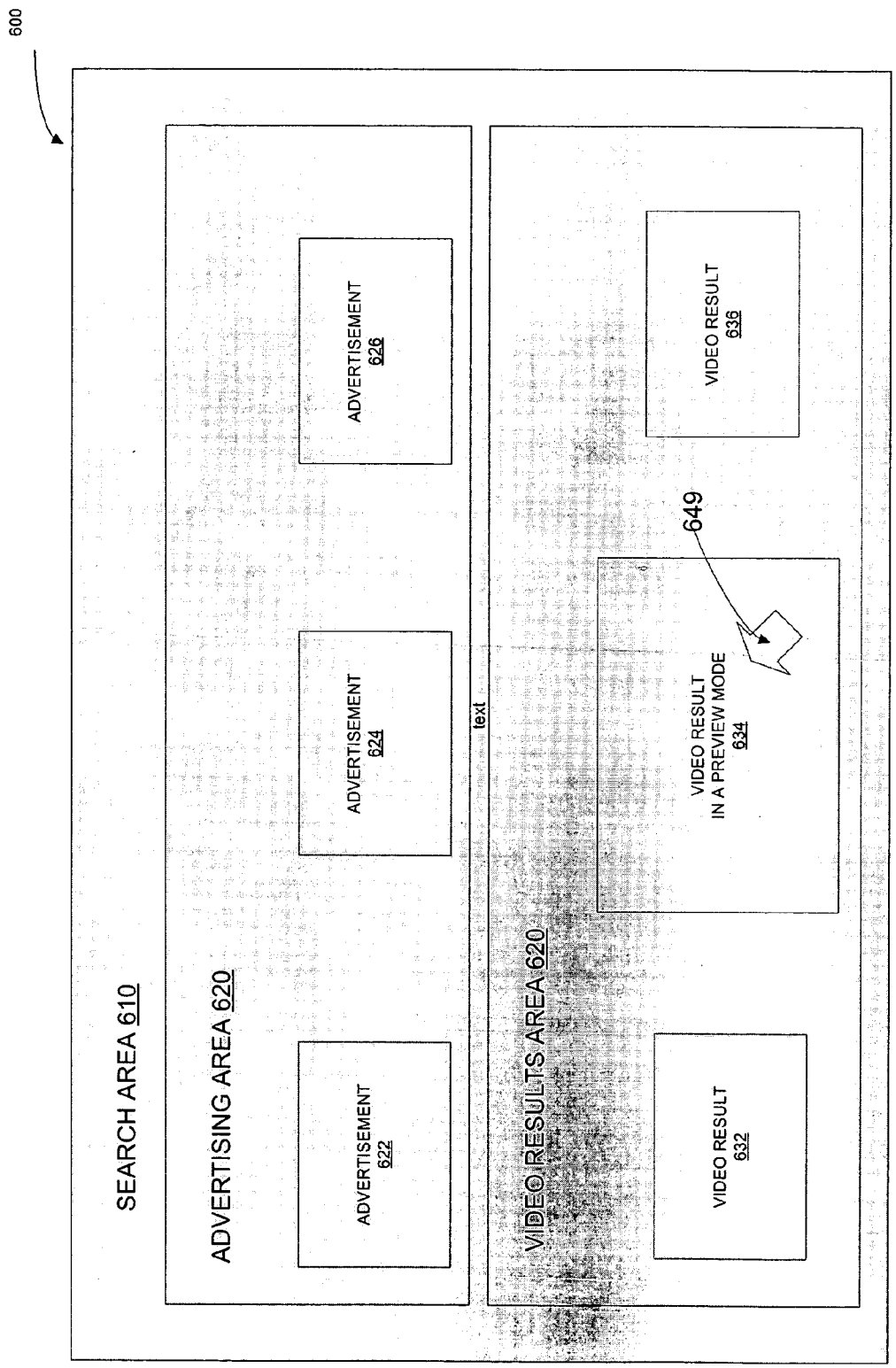
FIGS. 6A and 6B illustrate an exemplary user interface to provide preview of a video object, according to one embodiment of the present invention.
Figure 6B:
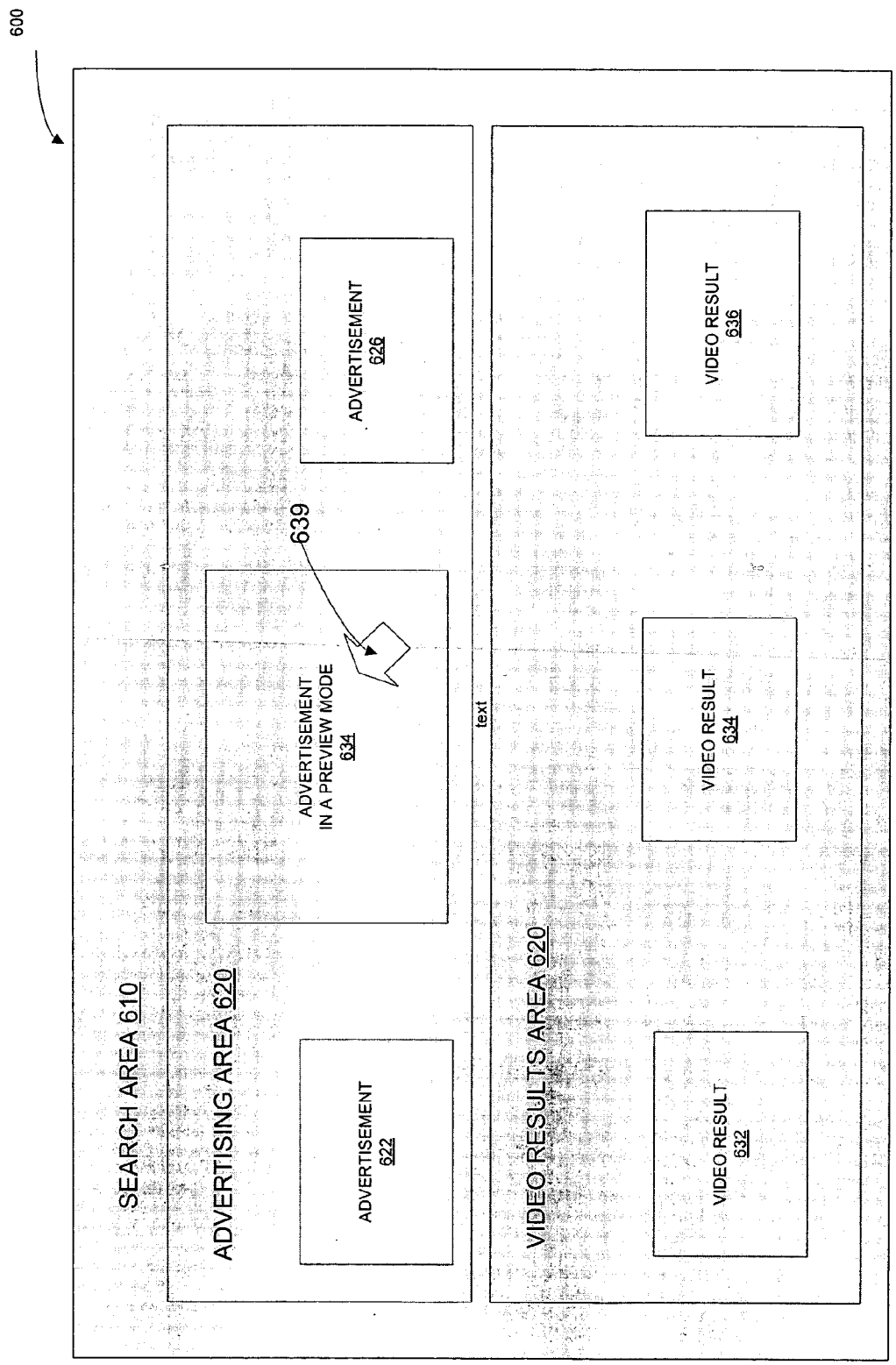

FIGS. 6A and 6B illustrate a user interface 600 to provide a preview of a video object. The user interface 600 may include a search area 610 to display objects served to a user in response to a search request. The search area 610 may include an advertising area 620 and a search results area 630. The advertising area 620 may include one or more advertisements, e.g., advertisements 622, 624, and 626. The search results area 630 may include one or more search results, e.g., search results 632, 634, and 636. In FIG. 6A, a pointer 639 is positioned over the search result 634 causing the search result 634 to be presented in a preview mode, here a higher resolution version of the video associated with the search result 634. In FIG. 6B, the pointer 639 is positioned over the advertisement 624 causing the advertisement 624 to be presented in a preview mode, here a higher resolution version of the video associated with the advertisement 624.

Figure 7:
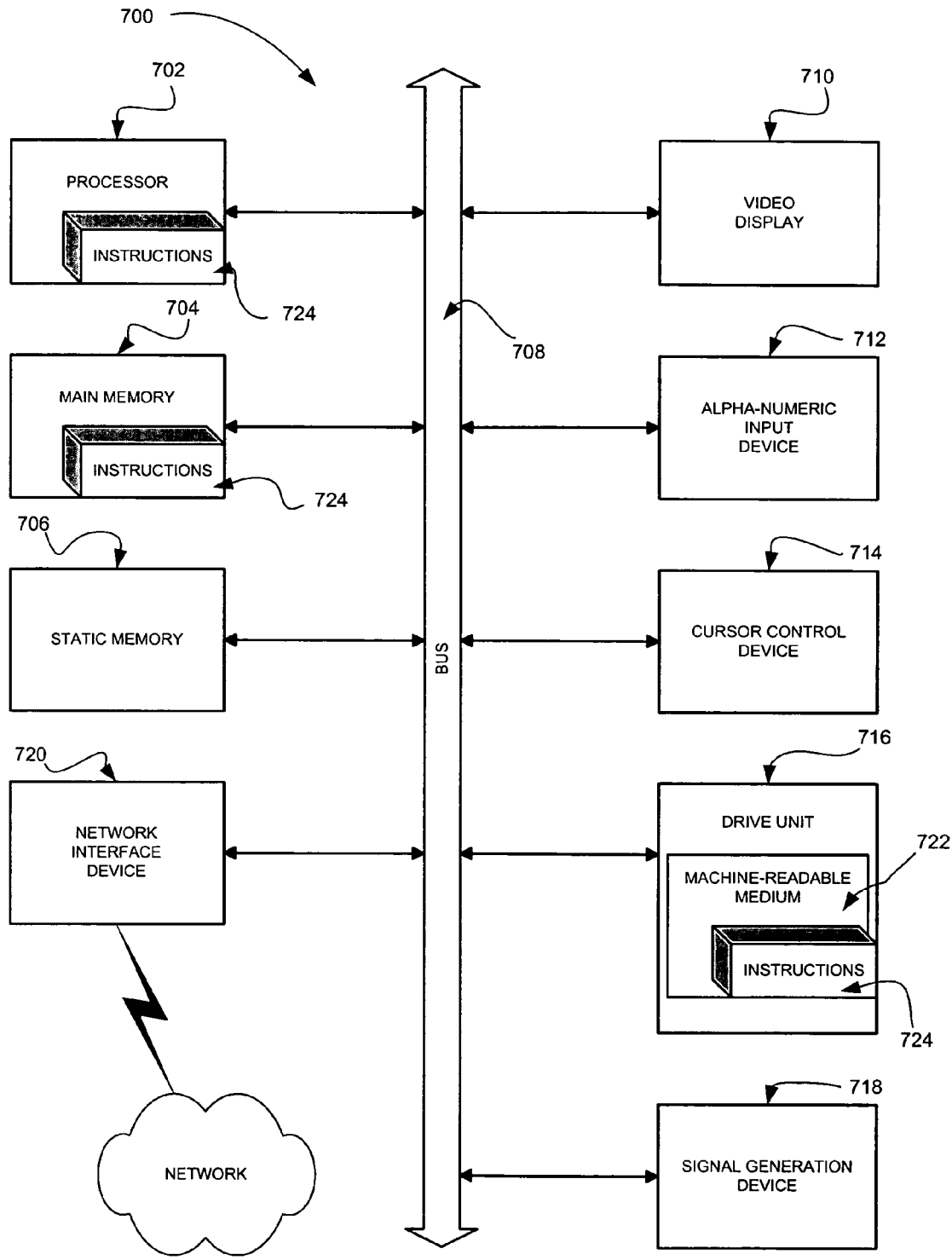
FIG. 7 is a diagrammatic representation of a computer system, within which a set of instructions, for causing the machine to perform any one or more of the methodologies discussed herein, may be executed.

FIG. 7 illustrates a diagrammatic representation of machine in the exemplary form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media. The software 724 may further be transmitted or received over a network 726 via the network interface device 720.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term.

Thus, method and system to present content have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art. Furthermore, instead of performing overall processes as described in reference to flowcharts, the search engine may only perform only parts thereof.

What is claimed is:

1. A method to present content to a user, the method comprising: receiving a search request originating from the user; extracting video search results based on the search request, the video search results being extracted from a database having metadata associated with web content, the video search results comprising a plurality of search result video objects; identifying one or more advertisements to be presented as video objects to the user based on the search request; responsive to the search request, simultaneously playing a first video object and a second video object from the plurality of search result video objects; detecting a selection from the user of the first video object of the playing video objects by detecting a pointer positioned over the first video object from the plurality of search results video objects; responsive to the detecting the selection, automatically pausing the second video object of the playing video object not selected to become a still image object and providing the first video object in preview mode by commencing playing of the first video object in a higher resolution mode; detecting deselection from the user of the first video object; and responsible to the deselection, automatically simultaneously playing the first video object and the second video object in lower resolution mode.

2. The method of claim 1, wherein the one or more advertisement video objects are identified based on characteristics associated with the search request.

3. The method of claim 1, wherein providing the first video object in the preview mode comprises streaming of audio associated with the first video object.

4. The method of claim 1, further comprising: detecting the pointer positioned over a second video object from the plurality of search result video objects; and providing the second video object in a preview mode.

5. A system to present content to a user, the system comprising: an access component to receive a search request and to extract video search results based on the search request, the video search results being extracted from a database having metadata associated with web content, wherein the video search results comprise a plurality of search result video objects;
   an advertisement selector to identify a plurality of advertisements to be presented as video objects based on the search request;
   a loader to simultaneously play a first video object and a second video object from the plurality of search result video objects; a trigger to detect a selection from the user of the first video object from the plurality of search result video objects by detecting a pointer positioned over the first video object from the plurality of search result video objects, wherein the loader is further configured to pause the playing of the second video object not selected by the user to become a still image object and to provide the first video in preview mode by commencing playing the first video object in higher resolution mode, detecting deselection from the user of the first video object, and responsive to the detection of the deselection, automatically simultaneously playing the first video object and the second video object in lower resolution mode.

6. The system of claim 5, wherein the advertisement selector is configured to identify the plurality of advertisement video objects based on characteristics associated with the search request.

7. The system of claim 6, wherein the characteristics associated with the search request comprise information related to past behavior of the user.

8. The system of claim 5, wherein the loader is further configured to pause streaming of the video objects not selected in response to the trigger detecting the pointer positioned over the first video object.

9. The system of claim 5, wherein the loader is further to provide the second video object in the preview mode responsive to the trigger detecting the pointer positioned over the second video object.

10. A machine-readable medium having stored thereon data representing sets of instructions which, when executed by a machine, cause the machine to:
   receiving a search request originating from the user;
   extracting video search results based on the search request, the video search results being extracted from a database having metadata associated with web content, the video search results comprising a plurality of search result video objects;
   identifying one or more advertisements to be presented as video objects to the user based on the search request;
   responsive to the search request, simultaneously playing a first video object and a second video object from the plurality of search result video objects;
   detecting a selection from the user of the first video object of the playing video objects by detecting a pointer positioned over the first video object from the plurality of search result video objects;
   responsive to the detecting the selection, automatically pausing the second video object of the playing video objects not selected to become a still image object and providing the first video object in preview mode by commencing playing of the first video in higher resolution mode;

detecting deselection from the user of the first video object; and responsive to the detection of the deselection, automatically simultaneously playing the first video object and the second video object in lower resolution mode.

* * * * *